United States Patent
Jönsson

(10) Patent No.: US 10,119,724 B2
(45) Date of Patent: Nov. 6, 2018

(54) ACCUMULATOR TANK

(71) Applicant: FUELTECH SWEDEN AB, Ronneby (SE)

(72) Inventor: Mikael Jönsson, Sölvesborg (SE)

(73) Assignee: FUELTECH SWEDEN AB, Ronneby (SE)

(*) Notice: Subject to any disclaimer, the term of this patent is extended or adjusted under 35 U.S.C. 154(b) by 73 days.

(21) Appl. No.: 15/289,588

(22) Filed: Oct. 10, 2016

(65) Prior Publication Data

US 2017/0023275 A1 Jan. 26, 2017

Related U.S. Application Data

(63) Continuation of application No. 13/518,626, filed as application No. PCT/SE2010/051414 on Dec. 17, 2010.

(30) Foreign Application Priority Data

Dec. 23, 2009 (SE) ...................................... 0901608

(51) Int. Cl.
*F24H 9/14* (2006.01)
*F24H 1/20* (2006.01)
*F24D 11/00* (2006.01)
*F24H 9/12* (2006.01)
(Continued)

(52) U.S. Cl.
CPC ............ *F24H 1/202* (2013.01); *F24D 11/002* (2013.01); *F24H 9/0005* (2013.01); *F24H 9/124* (2013.01); *F24H 9/14* (2013.01); *F28D 20/0039* (2013.01); *F24D 2220/08* (2013.01); *F28D 2020/006* (2013.01); *F28D 2020/0078* (2013.01); *F28D 2020/0086* (2013.01); *Y02E 60/142* (2013.01)

(58) Field of Classification Search
CPC .................. F24D 11/002; F24H 9/124; F28D 2020/0078; F28D 2020/0086; F28D 2020/006
See application file for complete search history.

(56) References Cited

U.S. PATENT DOCUMENTS

| 243,680 A | 7/1881 | Austin |
|---|---|---|
| 2,644,432 A | 7/1953 | Hummel |
| 2,823,649 A | 2/1958 | Flynn |

(Continued)

FOREIGN PATENT DOCUMENTS

| CH | 379093 | 8/1964 |
|---|---|---|
| CH | 621619 | 2/1981 |

(Continued)

*Primary Examiner* — Nathaniel Herzfeld
(74) *Attorney, Agent, or Firm* — Capitol City TechLaw

(57) ABSTRACT

An accumulator tank for handling a heat transfer medium, may have a tank top section and a bottom section. The accumulator tank may be connected to at least one heat-emitting system and at least one heat-absorbing system. The accumulator tank may have a plurality of partition walls located inside the tank and arranged between the bottom section and the top section for the purpose of dividing the tank into a plurality of spaces. The systems may be connected to at least one respective space so that a temperature gradient is created between the bottom section and the top section. Also disclosed is a system for distributing and handling heat and/or cold, the accumulator tank.

16 Claims, 3 Drawing Sheets

(51) Int. Cl.
  *F28D 20/00* (2006.01)
  *F24H 9/00* (2006.01)

(56) References Cited

U.S. PATENT DOCUMENTS

| | | | | |
|---|---|---|---|---|
| 3,381,111 | A | * | 4/1968 | Popyk ............... F24H 1/225 137/341 |
| 3,437,078 | A | * | 4/1969 | Olson ................ F24H 1/50 122/37 |
| 4,148,355 | A | | 4/1979 | Gehring |
| 4,253,446 | A | * | 3/1981 | Muller ............. F24D 17/0068 126/610 |
| 4,524,726 | A | | 6/1985 | Bindl |
| 4,593,169 | A | | 6/1986 | Thomas |
| 4,598,694 | A | | 7/1986 | Cromer |
| 4,632,066 | A | * | 12/1986 | Kideys ............... F24H 1/205 122/18.2 |
| 4,692,592 | A | | 9/1987 | Kale |
| 4,932,469 | A | * | 6/1990 | Beatenbough ....... F28D 1/0316 165/153 |
| 5,775,412 | A | * | 7/1998 | Montestruc, III .... F28D 9/0037 165/134.1 |
| 6,148,146 | A | | 11/2000 | Poore et al. |
| 6,321,036 | B1 | | 11/2001 | Huang |
| 7,644,686 | B2 | | 1/2010 | Threatt et al. |
| 2005/0005879 | A1 | | 1/2005 | Houle |
| 2006/0011149 | A1 | * | 1/2006 | Stevens ............... F24H 1/18 122/19.2 |
| 2010/0290763 | A1 | * | 11/2010 | Boulay ............... F24H 1/201 392/451 |

FOREIGN PATENT DOCUMENTS

| | | |
|---|---|---|
| DE | 4421137 A1 | 12/1994 |
| DE | 4438970 A1 | 5/1996 |
| DE | 10049278 | 4/2002 |
| DE | 10123305 A1 | 10/2002 |
| DE | 102004018034 A1 | 11/2005 |
| DE | 102007046905 | 4/2009 |
| DE | 102008013727 A1 | 9/2009 |
| EP | 0420220 | 4/1991 |
| EP | 2072912 A2 | 6/2009 |
| FR | 2405443 | 5/1979 |
| GB | 2322933 | 9/1998 |
| JP | S5661546 | 5/1981 |
| JP | S6011064 | 1/1985 |
| JP | S6030948 | 3/1985 |
| JP | S63161353 | 7/1988 |
| JP | S63502847 | 10/1988 |
| JP | H03160272 | 7/1991 |
| JP | H046076 | 1/1992 |
| JP | 2000329412 | 11/2000 |
| JP | 2003090626 | 3/2003 |
| JP | 2004173897 | 6/2004 |
| JP | 2004340457 | 12/2004 |
| JP | 2008014596 | 1/2008 |
| WO | 8702763 | 5/1987 |
| WO | 9712192 | 4/1997 |
| WO | 2008027041 A1 | 3/2008 |
| WO | 2009013781 | 1/2009 |
| WO | 2009042406 | 4/2009 |
| WO | 2009079791 | 7/2009 |
| WO | 2009130149 | 10/2009 |

\* cited by examiner

ABSTRACT TANK

ACCUMULATOR TANK

This application is a continuation application of U.S. patent application Ser. No. 13/518,626 filed Jun. 22, 2012, which is a US National Phase Application of International Application No. PCT/SE2010/051414 filed Dec. 17, 2010, the entire content of both of which are incorporated herein by reference.

This application claims priority under 35 USC § 119(a)-(d) to Swedish Patent Application No. 0901608-0 filed Dec. 23, 2009, the entire content of which is incorporated herein by reference.

TECHNICAL FIELD

The invention relates to an accumulator tank for handling a heat transfer medium, comprising a tank with a top section and a bottom section, wherein said accumulator tank is connected to at least one heat-emitting system and at least one heat-absorbing system. The invention further concerns a system for distributing and handling heat and/or cold, comprising an accumulator tank as described above.

BACKGROUND ART

When distributing and handling heat, hot water and/or cold in a house, a vehicle, a machine or an industrial plant an accumulator tank for storing hot or cold medium is provided in most cases. In a heating system for a house the accumulator tank is normally a hot-water heater with an integrated electric heater. Several other heating systems are often connected to said system, such as a heat pump, solar heat or a pellet boiler. In vehicles such as cars, lorries or boats the cooling water of the motor and/or a burner/heater is/are often used to heat the heating medium of the accumulator tank. To heat the medium in the accumulator tank water, for example, is circulated from a heater or from the cooling system of a motor through a coil of heat-conducting material, for instance copper or stainless steel, which is arranged in a tight spiral extending through the accumulator tank so as to form a large surface for transferring heat from the water of the heat source to the medium in the tank.

When an accumulator tank is not used for some time the medium therein, usually water, will form layers with the hottest water at the top and the coolest water at the bottom. For this reason the inlet to upright or vertical accumulator tanks is often located in the lower part whereas the outlet is located in the upper part of the tank. As water is drawn from the heater new water is introduced under pressure from below and this normally creates turbulence in the tank. When water is drawn after stratification has occurred and new, cold water is supplied from below turbulence is created and the stratification is destroyed. When the heating coil is activated again it will reinforce the turbulence through its homogeneous heating of the volume where there is a heat gradient. This also causes a variation in heat-exchange efficiency along the coil. The mixing of water reduces the maximum temperature and results in inefficient heating.

The problem of cold and hot water mixing has been solved in DE102007046905 by arranging an inlet chamber below the accumulator tank and a partition wall separating the two. The heating coil is placed in the inlet chamber for heating cold inlet water. Ascending pipes of fairly good size diameter are located in the accumulator tank, which is also called a stratification chamber, and are connected to the inlet tank. Heated water from the inlet tank rises in the pipes to the stratification already established in the accumulator tank.

In this way the hottest water can always be drawn from the top of the tank without the stratification being destroyed by the inlet water or the heating.

A problem with this type of tank arises when there is more than one heat source. Heat sources with a low temperature require a lower temperature of the water in the tank where the coil extends for an efficient heat exchange to occur. If the different heat sources used are, for example, a heat pump and a burner/wood boiler/pellet boiler/oil boiler where, for instance, the temperature of the outlet water from the heat pump is significantly lower than that of the boilers, it will be difficult to achieve in an efficient manner an energy exchange from the heat pump through coils in the tank if the boiler is used at the same time.

A further problem associated with prior art is that the coils used to heat the water of the accumulator tank are not very efficient, since the surface of the coils that is exposed to the water of the accumulator tank is relatively small. A solution to this problem is to use for example plate heat exchangers for the heat exchange, which increases efficiency. However, plate heat exchangers are expensive and they also cause problems as regards the stratification in the tank and may cause the water of the accumulator tank to start self-oscillating, which will destroy the stratification and reduce the heat exchange efficiency.

SUMMARY

An object of the present invention is to solve the above problems wholly or partly and achieve an improved accumulator tank for handling a heat transfer medium by providing a plurality of spaces in the tank with a temperature gradient between its bottom layer and top layer so as to obtain an efficient accumulation of heat in the tank.

This and other objects are achieved by an accumulator tank for handling a heat transfer medium, comprising a tank with a top section and a bottom section, wherein said accumulator tank is connected to at least one heat-emitting system and at least one heat-absorbing system. The accumulator tank is characterised by a plurality of partition walls located inside the tank and arranged between the bottom section and the top section for the purpose of dividing the tank into a plurality of spaces, said systems being each connected to at least one respective space so that a temperature gradient is created between the bottom section and the top section.

By dividing the tank into spaces the stratification in the tank can be improved and maintained also during draining/refilling of accumulator medium, during heating of the medium and during cooling of the medium.

Preferably, the partition walls of the accumulator tank are provided with holes for allowing the communication of medium between said spaces. In this way, the flow of heating medium between the spaces can be regulated so as to obtain a suitable flow which maintains correct heat stratification. If the water in a space is heated the medium in that space should move upwards if it becomes hotter than the space above in order to obtain the appropriate heat stratification.

It is further preferred for the partition walls of the accumulator tank to comprise aluminium, which facilitates the heat transfer in the tank due to the excellent thermal conductivity of the material. Using aluminium also makes the tank light, which makes it less expensive to transport and at the same time easy to recycle. Irrespective of the choice of material, it is also further preferred for the partition walls to be welded onto said accumulator tank, whereby the partition walls will increase considerably the strength of the tank.

In one embodiment of the present invention, said at least one heat-emitting system is located inside said accumulator tank. In another embodiment, said at least one heat-emitting system is located outside said accumulator tank. The heat-emitting system can comprise a heat exchanger which transfers the heat from an external heat source. This facilitates the connection of different heating systems to the accumulator system and their disconnection therefrom and makes it easy to switch heat source. The heat source can for example be selected from the group consisting of a solar heating plant, a water/water heat pump, an air/water heat pump, a rock source heat pump, a ground source heat pump, a groundwater heat pump, an electric heating system, a pellet heating system, a wood heating system and an oil heating system.

Heat-emitting systems such as heat pumps or burners/boilers are preferably placed outside the accumulator tank and connected to the tank by way of coils which circulate a medium such as water between the heat source and the tank, possibly connected to the tank via a heat exchanger. A heat-emitting system such as an electric heating element is preferably placed inside one of the spaces of the accumulator tank.

The problem with prior art, where poor heat exchange efficiency is obtained when several heat-emitting systems with different temperatures are used simultaneously, is solved according to the present invention by connecting them to different spaces in the tank which are located at different heights and thus have different medium temperatures. A heat-emitting system with a high outlet temperature, for example a wood, pellet or oil boiler, is preferably connected to a space of the accumulator tank that is located above the space to which a heat-emitting system with a lower outlet temperature, for example a geothermal heat pump, is connected. In this way the efficiency of the heat exchange can be influenced for different heating coils. If the main heat-emitting system has a low outlet temperature, for example a heat pump, this system is preferably connected at the bottom.

The problem with prior art where heat exchangers cause movement of the medium in the tank and may even cause self-oscillation is overcome by the partition walls arranged between the different spaces of the accumulator tank decelerating or even preventing the movement of the medium between the spaces of the accumulator tank. It is therefore possible, in a way that it was not before, to use heat exchangers for the heat exchange with heat-emitting systems and this is indeed preferable when using heat-emitting systems with relatively low outlet temperature, such as solar heaters and heat pumps, etc.

The accumulator tank according to the invention is also connected to at least one heat-absorbing system, which consumes the heat that is stored in the accumulator tank. The heat-absorbing system too can be connected by way of a heat exchanger. The heat-absorbing system can be one selected from the group consisting of a radiator, an electric heater, an underfloor heating coil, a ceiling heating coil, a wall heating coil, a tapwater heat exchanger. The advantage of using a heat exchanger with the heat-absorbing system is that this too makes it easier to connect and disconnect without interrupting the operation of the other systems. Moreover, in the case of tapwater, problems with bacteria in the accumulator tank can be avoided as can problems caused by the use of aluminium in the tank.

Furthermore, in the accumulator tank according to the invention at least one of said spaces can be provided with an inlet for supplying a medium from said heat-absorbing system and/or an outlet for discharging said medium to said heat-absorbing system. Moreover, at least one of said spaces can be provided with an inlet for supplying a medium from said heat-emitting system and/or an outlet for discharging said medium to said at least one heat-emitting system.

The inlet and outlet, respectively, of the heat-absorbing system are preferably connected to one of the top spaces of the accumulator tank so as to have access to the hottest water accumulated in the tank. In the case of several heat-absorbing systems, such as hot-water tapwater and waterborne heat for radiators, the hot-water outlet is preferably connected to the hottest space of the tank whereas the outlet for the radiators is connected to a space further down in the accumulator tank where the temperature is suitable for radiators. The inlet from the radiator system, where cooled water is returned, is connected at the appropriate level.

In a preferred embodiment of the present invention, at least one of said spaces of the accumulator tank is provided with at least one pipe for communication of medium with said heat-absorbing system. Furthermore, at least one of said spaces is provided with at least one pipe for communication of medium with said at least one heat-emitting system. Preferably, the pipes can extend from the upper surface of the accumulator tank to the different spaces of the tank, one outlet pipe to each space and/or one inlet pipe to each space. A control system can then be used to connect, by means of valves, for example the inlet from a heat-absorbing system, such as a waterborne radiator system, with the appropriate space as regards the temperature of the return water. The control system measures the temperature of the return water in order to select an inlet pipe that conducts the water to the appropriate heat layer. The control system can also use this in order to decide, via sensors that determine the temperature in the spaces of the accumulator tank, from which level the outlet for a certain system is to be connected, for example a waterborne radiator system. The control system can be connected to the heat-absorbing system and can control the outlet temperature by drawing water from the appropriate space so that the desired heat extraction from the accumulator is achieved.

Moreover, the medium of the accumulator tank preferably comprises water, which is a cheap and simple energy carrier. In the case where heat exchange is used in connection with the drawing of tap water, the water can preferably be mixed with glycol or any other medium that has an anti-corrosive effect and/or prevents the system from freezing if it is not used and the surrounding environment has a temperature below the freezing point.

The invention further includes a system for distributing and handling heat and/or cold, comprising an accumulator tank as described above. The above description has focused on the storage of heat in the accumulator tank, but it will be obvious to the person skilled in the art that the system may just as well be used to store cold, for example when used in air conditioning systems or freezing/cooling systems for food. The medium in the system is then preferably a regular coolant or refrigerant.

BRIEF DESCRIPTION OF THE DRAWINGS

The invention will be described in more detail below for the purpose of exemplification, reference being made to the accompanying drawings.

DETAILED DESCRIPTION OF PREFERRED EMBODIMENTS

Figure 1:
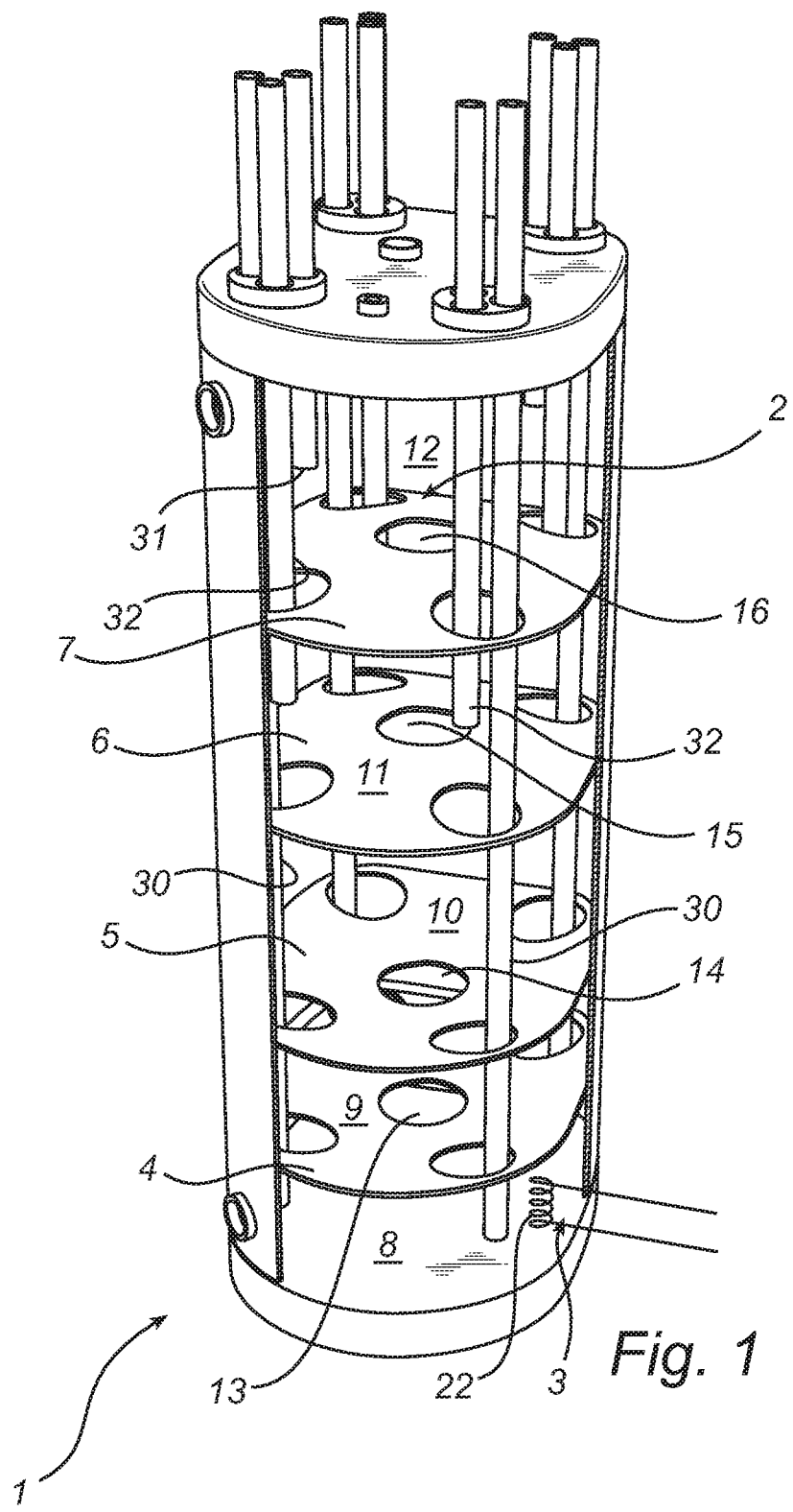
FIG. 1 shows a model of an accumulator tank according to the present invention. A section of the accumulator tank has been removed to show the pipes and partition walls.

FIG. 1 shows a preferred embodiment of an accumulator tank 1 according to the present invention. The accumulator tank 1 is upright, shaped like a straight D-shaped cross-section cylinder and has a top section 2 and a bottom section 3 as well as inner partition walls 4, 5, 6, 7 which divide the tank into a plurality of spaces 8, 9, 10, 11, 12. Each partition wall has holes 13, 14, 15, 16 for allowing communication of medium between the spaces 8, 9, 10, 11, 12. There is also provided in each partition wall and in the upper end surface of the accumulator tank 1 holes 17, 18, 19, 20 through which pipes or bundles of pipes 21 are adapted to extend. In the circumferential surface of the accumulator tank 1, two or more connecting means 23, 24, 26, 27, 28, 29 are provided for communication with two or more spaces 8, 9, 10, 11, 12 of the accumulator tank 1.

A connection can be established with each of the spaces 8, 9, 10, 11, 12 according to the embodiment shown in FIG. 1 via the respective penetrating pipe for communication of medium 30, 31, 32 from the upper end surface of the accumulator tank. In addition, there are connecting means enabling communication through the circumferential surface of the accumulator tank 1 with most of the spaces 8, 9, 10, 11, 12 of the accumulator tank 1.

The medium used in the accumulator tank 1 is preferably water or water mixed with an alcohol for anti-corrosion and anti-freeze protection. When the medium in the accumulator tank 1 has been heated the medium will stratify so that the hottest medium accumulates in the top section 2 of the accumulator tank and the coldest medium in the bottom section 3 of the accumulator tank. This is a phenomenon which makes it possible to draw hot medium from the top section 2 of the accumulator tank and cold medium from the bottom section 3 of the accumulator tank. When the accumulator tank 1 is in use and medium is drawn from and supplied to the accumulator tank 1 there is a risk that turbulence will occur destroying the stratification. The partition walls 4, 5, 6, 7 with their communication holes 13, 14, 15, 16 help to considerably slow down the displacement of medium between the spaces 8, 9, 10, 11, 12 of the accumulator tank 1 and to reduce or prevent turbulence between the spaces.

In the embodiment shown in FIG. 1, a heat-emitting system 22 is also arranged in the lowermost space 8 of the accumulator tank. The heat-emitting system 22 is in the embodiment shown an electric heater. Alternatively, a medium from alternative or additional heat-emitting systems can be supplied through connections on the upper surface of the accumulator tank and be conducted to the lowermost space via the penetrating pipes for communication of medium 30, 31, 32.

Figure 2:
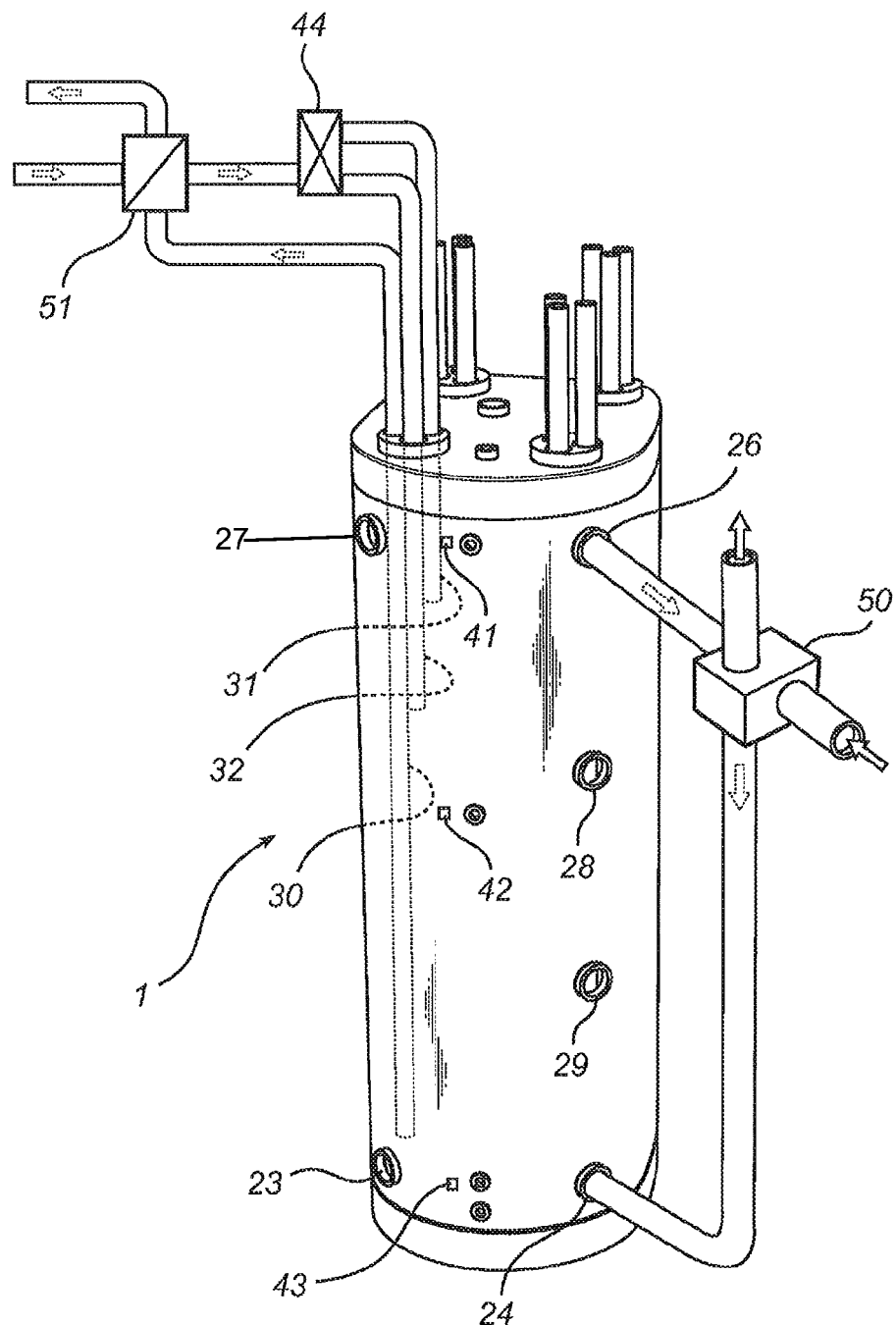
FIG. 2 shows the accumulator tank according to the present invention with examples of the connection of a heat-emitting system (not shown) and a heat-absorbing system (not shown).
Figure 3:
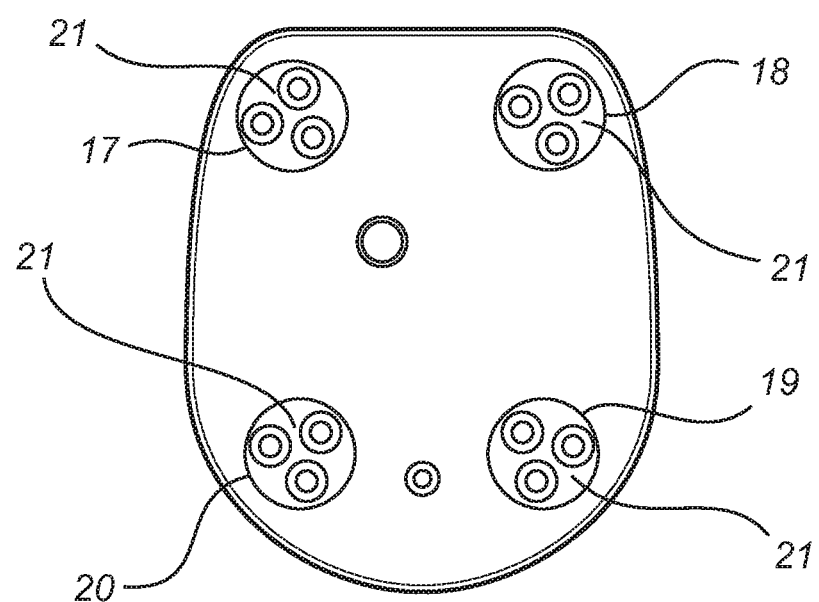
FIG. 3 shows the D-shaped upper end surface of the accumulator tank.

Heat-emitting system can be for example a solar heating plant, a water/water heat pump, an air/water heat pump, a rock source heat pump, a ground source heat pump, a groundwater heat pump, an electric heating system, a pellet heating system, a wood heating system or an oil heating system. As shown in FIGS. 2 and 3, one or more of these heat-emitting systems can be connected to the accumulator tank 1 via a respective pipe bundle 17, 18, 19, 20. A medium that is to be heated by the heat-emitting system is preferably drawn from the lowermost space 8 via the pipe 30 of the bundle that extends to said space. Once heated by the heat-emitting system the medium is then passed back to an appropriate level in the accumulator tank, for example via pipe 31 or 32, depending on how hot it is. A medium from a pellet, wood or oil boiler is usually very hot and is therefore conducted to the uppermost space 12 via the pipe 31. A medium from a heat-emitting system which does not heat the medium to the same extent, such as different types of heat pumps or solar heating systems, is conducted to a space further down where the temperature is substantially the same as that of the supplied medium, e.g. space 11 via pipe 32, so as not to cause too much movement in the medium in the accumulator tank, which would destroy the stratification.

Adjacent to each pipe bundle a control system can be arranged which via a temperature sensor 41 measures the temperature of the heated medium that is supplied to the accumulator tank from the heat-emitting system concerned. Sensors 41, 42, 43 can also be positioned in the other spaces 11, 12 of the accumulator tank or in all of the spaces 8, 9, 10, 11, 12 of the accumulator tank. The control system compares the temperature of the medium supplied from the heat-emitting system with the temperature in the spaces of the tank. A bypass valve 44 is then controlled such that the medium is conducted via a penetrating pipe for communication of medium, e.g. pipe 31 or 32, to the space where the temperature is as close to the temperature of the incoming medium as possible. Accordingly, very hot medium is conducted to the uppermost space 12, whereas less hot medium is conducted to a space further down. An example of heat-emitting systems whose supply temperature varies greatly is for example solar heating systems.

In FIGS. 1 and 2 only two pipes for communication of medium 31, 32 are shown which are adapted to supply the tank with heated medium. It should be noted, however, that more pipes for communication of medium can be used to ensure that the heated medium is delivered with greater precision at the right level. It should also be noted that all the pipes through which a medium is supplied to the accumulator tank 1 and all the connections in the circumferential surface where a medium is supplied to the accumulator tank are each preferably provided with a diffusor (not shown) in order to minimize the turbulence in the spaces 8, 9, 10, 11, 12 of the accumulator tank into which the medium is flowing.

The connecting means 26, 27 in the circumferential surface of the accumulator tank adjacent to the uppermost space 12 can be connected to a heat-absorbing system, for instance for drawing hot tap water. To avoid problems with bacteria in the accumulator tank 1 and/or enable the use of another medium than pure water in the accumulator tank, a heat exchanger 50 is preferably used which transfers the heat of the heating medium to the tap water. Cooled medium is then conducted to the lowermost space via the connection 24 for heating purposes. Nevertheless, hot tap water can be tapped directly from the tank from connection 26 or 27 and can be replaced by cold water through connection 23 or 24 if pure water is used in the accumulator tank and the use of a heat exchanger is considered too complicated or expensive.

Other heat-absorbing systems connected to the accumulator tank are usually systems for heating, for instance, a house, a vehicle or a ship. It can be radiators, electric heaters, underfloor heating coils, ceiling heating coils or wall heating coils. The medium in such heating systems need not be as hot as hot tap water and is therefore drawn from a lower level in the accumulator tank where the medium has a lower temperature than in the top space 12. This is why in FIG. 2 the medium is drawn from the second highest space 11 via the connection 28 and conducted to the heat-absorbing system concerned, for example a radiator system. Once the medium has been cooled in the radiators it is returned to the accumulator tank. Since the temperature of the outlet medium in heat-absorbing systems is often relatively high as compared with the temperature of cold water, the medium is returned to a space in the accumulator tank which already has a higher temperature, to the space 10 (FIG. 1) via the connection 29 (FIG. 2). In this way, the accumulator tank is used in an efficient manner and the stratification achieved is disrupted as little as possible, i.e. the water movements in the accumulator tank will be as small as possible.

It should be noted that heat-absorbing systems can also be attached to connecting means on the upper end surface of the accumulator tank by adapting the pipes of one of the pipe bundles 21 so that they match the current system. If the amount of heat in the accumulator tank varies greatly over time a heat-absorbing system can be connected to several spaces so that it can draw heat from different spaces depending on the current temperature in the spaces, thereby allowing the same temperature to be delivered to the heat-absorbing system at all times. This is preferably controlled by means of a bypass valve (not shown) analogously with the controlling of medium for the medium heated by a heat-emitting system via the bypass valve 44 described above.

As an alternative to conducting water directly from the accumulator tank to/from a heat-absorbing system, a heat exchanger can be used to separate the medium of the heat-absorbing system from the medium of the accumulator tank. In other respects the system is connected in the same way as described above, i.e. the outlet medium is drawn from the coldest medium in the lowermost space 8 and is returned at the appropriate level depending on the amount of heat acquired. The advantage of using a heat exchanger 51 is that the return temperature delivered to the accumulator tank 1 can be regulated by adjusting the flow velocity of the two separate systems, which increases the possibilities of setting the temperature of the inlet medium to the accumulator tank 1. It also makes the connection of heating systems to the accumulator tank 1 and disconnection therefrom easier.

In the above example, heat-emitting systems have been connected to connecting means 23, 24, 26, 27, 28, 29 which are arranged on the circumferential surface of the accumulator tank, whereas the heat-absorbing systems have been connected to connecting means 21 on the upper side of the tank. It should be noted that it is possible to connect the systems via any one of the connecting means. All connections can be effected, for example, via the D-shaped upper end surface of the tank, which saves space in the horizontal plane. The advantage of the pipe bundles 21 that are connected to the holes 17, 18, 19, 20 is that the length of the pipes for communication of medium can be adapted to enable connection to any optional space 8, 9, 10, 11, 12 of the tank and at any optional height in the respective space 8, 9, 10, 11, 12. This means that the accumulator tank 1 can be easily adapted and connections for heat-absorbing systems and heat-emitting systems can be placed so as to fit in the space where the accumulator tank 1 is to be installed.

The present invention may just as well be used as a system for accumulating cold. In that case, a medium with a low freezing point is suitably used, for example an alcohol or a water/alcohol mix. In the same manner as described above, cold is drawn from the lower spaces 8, 9 via the connections in the circumferential surface. The lowermost space may, for instance, be connected to a cooling system which requires a large amount of cold, such as a refrigerator and a freezer, while the space above is connected to systems that do not require the same amount of cold, for example an air conditioning system. A heat-emitting system such as a compressor is connected via the penetrating pipes for communication of medium 30, 31, 32. The heat-emitting cooling system draws the hottest medium in the accumulator tank from the uppermost space 12 and returns in the same manner as that described above cooled medium to the lowermost spaces 8, 9 depending on the temperature of the cooled medium and the temperature of the medium in the respective spaces.

The invention claimed is:

1. An accumulator tank for handling a heat transfer medium, comprising:
   a tank with a top section and a bottom section;
   a plurality of partition walls located inside the tank and arranged between the bottom section and the top section to divide the tank into a plurality of spaces;
   wherein the accumulator tank is connected to a heat-emitting system and a heat-absorbing system, each of the heat-emitting system and the heat-absorbing system being connected to at least one respective space so that a temperature gradient is created between the bottom section and the top section;
   wherein the partition walls are welded onto the accumulator tank along substantially its entire inner periphery, such that the strength of the accumulator tank is increased and movement of the medium between the spaces of the accumulator tank along its inner walls is prevented;
   wherein the tank has the shape of an upright cylinder with a D-shaped cross-section when viewed from above and is devoid of any external structural support;
   wherein a flat wall of the cross-section has an exposed outer surface;
   wherein a plurality of pipes in a first bundle penetrate through an upper end surface of the tank, extend inside the tank, and each pipe respectively opens into a different one of the spaces;
   wherein a plurality of pipes in a second bundle penetrate through the upper end surface of the tank, extend inside the tank and each pipe respectively opens into a different one of the spaces;
   wherein the plurality of pipes in the first bundle are connected to the heat-emitting system; and
   wherein the plurality of pipes in the second bundle are connected to the heat-absorbing system.

2. The accumulator tank according to claim 1, wherein the partition walls are provided with holes for allowing communication of medium between the spaces.

3. The accumulator tank according to claim 1, wherein the partition walls are fabricated from aluminium.

4. The accumulator tank according to claim 1, wherein an additional heat-emitting system is located inside the accumulator tank.

5. The accumulator tank according to claim 1, wherein the heat-emitting system is located outside the accumulator tank.

6. The accumulator tank according to claim 1, wherein the heat-emitting system comprises a heat exchanger.

7. The accumulator tank according to claim 1, wherein the heat-emitting system includes at least one of a solar heating plant, a water/water heat pump, an air/water heat pump, a rock source heat pump, a ground source heat pump, a groundwater heat pump, an electric heating system, a pellet heating system, a wood heating system, and an oil heating system.

8. The accumulator tank according to claim 1, wherein the heat-absorbing system comprises a heat exchanger.

9. The accumulator tank according to claim 1, wherein the heat-absorbing system includes at least one of a radiator, an electric heater, an underfloor heating coil, a ceiling heating coil, a wall heating coil, and a tap water heat exchanger.

10. The accumulator tank according to claim 1, wherein at least one of the spaces is provided with an inlet for supplying the medium from the heat-absorbing system and/or an outlet for discharging the medium to the heat-absorbing system.

11. The accumulator tank according to claim 1, wherein at least one of the spaces is provided with an inlet for supplying the medium from the heat-emitting system and/or an outlet for discharging the medium to the heat-emitting system.

12. The accumulator tank according to claim 1, wherein at least one of the spaces is provided with at least one pipe for communication of medium with the heat-absorbing system.

13. The accumulator tank according to claim 1, wherein at least one of the spaces is provided with at least one pipe for communication of medium with the heat-emitting system.

14. The accumulator tank according to claim 1, wherein the medium comprises water.

15. A system for distributing and handling heat and/or cold, comprising an accumulator tank according to claim 1.

16. An accumulator tank for handling a heat transfer medium, comprising:
a tank with a top section and a bottom section;
a plurality of partition walls located inside the tank and arranged between the bottom section and the top section to divide the tank into a plurality of spaces;
wherein the tank is connected to a heat-emitting system and a heat-absorbing system, each of the heat-emitting system and the heat-absorbing system being connected to one of the top and the bottom sections so that a temperature gradient is created between the bottom section and the top section;
wherein the partition walls are welded to the accumulator tank such that the strength of the accumulator tank is increased and movement of the medium between the spaces of the accumulator tank along its inner walls is inhibited;
wherein the tank has the shape of an upright cylinder with a D-shaped cross-section when viewed from above during use;
wherein a flat wall of the cross-section has an exposed outer surface;
wherein a bundle of pipes penetrate through an upper end surface of the tank, extend inside the tank, and each pipe respectively opens into a different one of the spaces; and
wherein the bundle of pipes includes (1) a plurality of inlet pipes, or (2) a plurality of outlet pipes.

* * * * *